United States Patent [19]

Rehmer

[11] Patent Number: 5,026,742

[45] Date of Patent: Jun. 25, 1991

[54] RADIATION-CROSSLINKABLE CONTACT ADHESIVE MIXTURES

[75] Inventor: Gerd Rehmer, Bobenheim-Roxheim, Fed. Rep. of Germany

[73] Assignee: BASF Aktiengesellschaft, Ludwigshafen, Fed. Rep. of Germany

[21] Appl. No.: 393,963

[22] Filed: Aug. 15, 1989

[30] Foreign Application Priority Data

Aug. 20, 1988 [DE] Fed. Rep. of Germany ....... 3828400

[51] Int. Cl.$^5$ .......................... C08F 8/30; C08L 77/00
[52] U.S. Cl. ...................................... 522/116; 525/178
[58] Field of Search ......................................... 522/116

[56] References Cited

U.S. PATENT DOCUMENTS 4,532,021 7/1985 Murphy et al. ..................... 522/116

FOREIGN PATENT DOCUMENTS 0563029 3/1983 Australia .
1448737 9/1976 United Kingdom .

*Primary Examiner*—Marion E. McCamish
*Assistant Examiner*—Susan Berman
*Attorney, Agent, or Firm*—Oblon, Spivak, McClelland, Maier & Neustadt

[57] ABSTRACT

Radiation-crosslinkable contact adhesive mixtures are prepared from polymers having a glass transition temperature of less than 0° C. and a K value of from 20 to 80, derivatives of dihydroxypropyl (meth)acrylates as reactive diluents and small amounts of polymerizable tertiary amino compounds by a process in which the mixture is heated at from 80° to 120° C. for not more than 2 hours and solvents are then separated off under atmospheric or reduced pressure.

9 Claims, No Drawings

RADIATION-CROSSLINKABLE CONTACT ADHESIVE MIXTURES

Radiation crosslinkable contact adhesive mixtures which contain olefinically unsaturated polymerizable compounds (often referred to as reactive diluents) must have a long shelf life even at relatively high temperatures. Their viscosity must not increase significantly since it will otherwise be more difficult to coat substrates. Furthermore, elevated temperatures are frequently used in the preparation of radiation-crosslinkable contact adhesive mixtures, so that undesirable polymerizations may occur here. To prevent these, stabilizers intended to prevent premature polymerization and hence an increase in the viscosity are frequently added to such radiation-crosslinkable contact adhesive mixtures However, inhibitors of this type often prevent a desirable radiation-induced polymerization of the mixtures.

Australian Patent 563,029 discloses a process for the preparation of self-adhesive coatings, in which coatings of a pourable material which contains olefinically unsaturated polymerizable compounds are converted into the ready-to-use state by exposure to high energy radiation. These known materials contain, as olefinically unsaturated polymerizable compounds, in particular alkyl ethers or esters of 2,3- and/or 1,3-dihydroxypropyl acrylates with saturated carboxylic acids, monoalkyl ethers and monoalkylcarboxylic esters of dihydroxypropyl acrylates being of particular importance. In addition to such dihydroxypropyl (meth)acrylate derivatives, these materials generally contain from 5 to 120% by weight, based on the amount of the dihydroxypropyl (meth)acrylate derivatives, of polymers having a glass transition temperature of less than 0° C. and a K value of from 20 to 80. In the preparation of such contact adhesive mixtures, however, wall deposits, which are difficult to remove, frequently occur in the kettles. Furthermore, such contact adhesive mixtures have an unsatisfactory shelf life and it is generally necessary to use temperatures above 80° C. during their application to the conventional substrates.

It is an object of the present invention to provide a process for the preparation of contact adhesive mixtures, in which deposits on the kettle wall are substantially avoided. It is a further object of the present invention to prepare radiation-crosslinkable contact adhesive mixtures whose viscosity shows virtually no increase on prolonged storage, which can be applied at a relatively low temperature and which can be crosslinked in the air both with electron beams and with UV light.

We have found that this object is achieved and that radiation-crosslinkable contact adhesive mixtures can advantageously be prepared from
(a) from 5 to 120 parts by weight of polymers having a glass transition temperature of less than 0° C. and a K value of from 20 to 80 and
(b) 100 parts by weight of derivatives of dihydroxypropyl (meth)acrylates,
if 30–85% strength by weight solutions of the polymers (a) are mixed with the derivatives (b) and (c) from 0.01 to 0.1% by weight, based on the polymers (a), of a polymerizable tertiary amino compound, the mixture is heated at 80°–120° C. for not more than 2 hours and the solvent is then separated off under atmospheric or reduced pressure.

Such contact adhesive mixtures during whose preparation virtually no deposits occur on the kettle walls can be stored in the dark for several months without their viscosity increasing significantly, and in general there is no need to use temperatures above 70° C. during application to substrate surfaces.

Although British Patent 1,448,737 has disclosed radiation-curable, non-gelled materials consisting of esters of polyhydric alcohols, which possess tertiary amino groups, these materials do not contain any polymers having a glass transition temperature below 80° C. and a K value of from 20 to 80. Instead, they are materials, curable in the air with UV light, for coating materials for coating paper, and for inks and printing inks which are intended to be readily degradable in the cured state with the aid of dilute alkalis.

Suitable polymers (a) are those which have a glass transition temperature at less than 0° C. and a K value, determined according to DIN 53,726 in 1% strength solution in tetrahydrofuran at 25° C., of from 20 to 80 and which can be prepared in a conventional manner using free radical initiators by emulsion, suspension, melt or, preferably solution polymerization. For example, polymers or copolymers of monoolefinically unsaturated carboxylic esters, of straight-chain or branched esters of acrylic and/or methacrylic acid, which esters contain alkyl of 1 to 12 carbon atoms, such as methyl, ethyl, propyl, butyl, pentyl, hexyl, 2-ethylhexyl, octyl, decyl and dodecyl acrylate and methacrylate, and of vinyl esters, such as vinyl acetate, vinyl propionate, vinyl ethylhexonoate, vinyl versatate and vinyl laurate, are suitable. In addition to the carboxylic esters, other olefinically unsaturated monomers and in general mono- or dicarboxylic acids of 3 to 5 carbon atoms, for example acrylic, methacrylic, maleic, fumaric, itaconic or crotonic acid, and acidic or neutral alkyl esters of the unsaturated dicarboxylic acids may be present as copolymerized units. Other suitable conomers are monomers containing hydroxyl groups, such as hydroxyethyl, hydroxypropyl and hydroxybutyl acrylate and methacrylate, and the x-hydroxypropylalkoxy acrylates and methacrylates derived from oligomers or polymers of ethylene oxide or of propylene oxide, hydroxyalkyl vinyl ethers, such as hydroxyethyl and hydroxypropyl vinyl ether, dihydroxy compounds, such as 2,3-dihydroxypropyl acrylate and methacrylate, chlorohydroxypropyl acrylate and vinylaromatic monomers, such as styrene and vinyltoluene, as well as amides of a,β-olefinically unsaturated mono- and/or dicarboxylic acids, such as acrylamide and methacrylamide, or nitriles, such as acrylonitrile and methacrylonitrile, vinyl halides, such as vinyl chloride and vinylidene chloride, 1,3-dienes, such as butadiene and isoprene, alkyl esters of a,β-monoolefinically unsaturated dicarboxylic acids, such as diethyl and dibutyl maleate. The polymers (a) are present in the novel radiation-crosslinkable contact adhesive mixtures preferably in amounts of from 20 to 100 parts by weight. Particularly preferred polymers (a) are copolymers of acrylates and/or methacrylates, vinyl esters and from 0.5 to 5% by weight, based on the polymers (a), of a,β-monoolefinically unsaturated mono- and/or dicarboxylic acids and/or their amides of the abovementioned type, which may contain not more than 30% of styrene and/or a-methylstyrene as copolymerized units.

Suitable derivatives of dihydroxypropyl acrylates (b) are both the 2,3-dihydroxyprop-1-yl and the 1,3-dihydroxyprop-2-yl compounds. The alkyl ethers and esters with saturated carboxylic acids are particularly suitable, monoalkyl ethers and monoalkylcarboxylic esters of dihydroxypropyl (meth)acrylates being of particular importance. Dihydroxypropyl acrylate derivatives which are particularly preferred because they are readily obtainable are of the general formulae

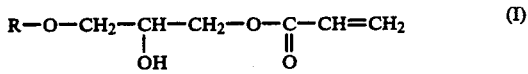

(I)

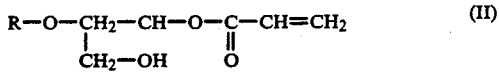

(II)

where R is an alkyl or acyl group of 4 to 16, in particular 6 to 12, carbon atoms. Examples of these are the mono-n-butyl, mono-2-ethylhexyl, monoisononyl, monoisooctyl, monodecyl and monolauryl ethers of 2,3-dihydroxypropyl acrylate and of 1,3-dihydroxyisopropyl acrylate and their monoisovaleric esters, mono-2-ethylhexanoic esters, monoversatic esters, monolauric esters and monopalmitic esters. Such derivatives of dihydroxypropyl (meth)acrylates can also be used as mixtures. Derivatives (b) of this type can readily be prepared, for example as described in Australian Patent 563,029. Examples of suitable polymerizable tertiary amino compounds (c) are N,N-dimethylethylaminoethyl (meth)acrylate, N,N-diethylaminoethyl (meth)acrylate, 3-N-morpholinopropyl (meth)acrylamide, 4-methacrylamido-2,2,6,6-tetramethylpiperidine and 2-N-morpholinoethyl (meth)acrylate.

Such polymerizable tertiary amino compounds are copolymerizable with the derivatives (b) and preferably have only one copolymerizable olefinic double bond.

In the preparation of the novel contact adhesive mixtures, the polymers (a) are used in the form of a 30–85, preferably 40–60, % strength by weight solution, in particular in ethyl acetate, toluene, isopropanol, isobutanol, ethanol, xylene, benzene, gasolines boiling within a range from 60° to 140° C. and ketones, such as methyl ethyl ketone, etc. Of particular interest as solvents for this purpose are ethyl acetate, tetrahydrofuran, toluene and xylene.

The solutions of the polymers (a) can be mixed with the derivatives (b) and the tertiary amino compounds (c) in any order, and the solutions of the polymers (a) may be at elevated temperatures, for example from 50° to 100° C. The mixture is then heated at from 80° to 120° C. for up to 2 hours, after which the solvents are evaporated off under atmospheric or reduced pressure. Temperatures of from 60° to 150° C. and pressures down to 0.01 bar may be used for evaporating off the solvents.

Particularly when the radiation-crosslinkable contact adhesive mixtures are to be crosslinked by UV radiation after their preparation, it is advantageous to add conventional photoinitiators to the mixtures during or after their preparation. Examples of suitable photoinitiators are acylphosphine oxides, such as 2,4,6-trimethylbenzoyldiphenylphosphine oxide and ethyl 2,4,6-trimethylbenzoylphenylphosphinate, benzyl ketals, such as benzyl dimethyl ketal, benzoin ethers, such as benzoin isopropyl ether, benzil, acetophenone derivatives, such as dialkoxyacetophenones, benzophenone and benzophenone derivatives, such as 4-hydroxybenzophenone, a-acyloxime esters, such as benzil 0-ethoxycarbonyl-a-monoxime, a-haloketones, such as para-tert-butyltrichloroacetophenone, thioxanthone and anthraquinone. Of particular interest as photoinitiators and benzophenone, 3-hydroxybenzophenone, 4-hydroxybenzophenone and benzophenonecarboxylic acids, such as benzophenone-2-carboxylic acid, benzophenone-3-carboxylic acid and benzophenone-4-carboxylic acid, and acylphosphine oxides, such as 2,4,6-trimethylbenzoyldiphenylphosphine oxide, and ethyl 2,4,6-trimethylbenzoylphenylphosphinate and thioxanthone.

In some cases, it is advantageous to add conventional tackifiers in amounts of not more than 50, preferably from 2.5 to 25, % by weight, based on the prepared mixture, to the contact adhesive mixtures in the process. Examples of these are balsam resins, terpene resins, rosin, hydrogenated rosin, esters of rosin or of hydrogenated rosin, such as the glycerol ester, the pentaerythritol ester, the ethylene glycol ester, the diethylene glycol ester, the methyl ester or the propyl ester of (hydrogenated) rosin. Esters of the hydroabietyl alcohol formed when the rosin is completely hydrogenated are also suitable, for example the benzoate or phthalate. Other good tackifiers are the conventional terpene phenol resins, alkylphenyl resins, ketone resins, such as condensates of cyclohexanone, aldehyde resins, and styrene copolymers which are obtained, for example, by polymerization of styrene with methacrylates, vinyltoluene or isobutylene. Coumarone resins, indene resins, hydrocarbon resins and low molecular weight polyvinylidene isobutyl ethers or polyolefins, such as low molecular weight polyisobutylenes, are also suitable. The amount of such tackifiers should preferably be from 5 to 40% by weight, based on the amount of polymers (a).

Finally, small amounts, in general from 0.1 to 10% by weight, based on derivatives (b), of polyolefinically unsaturated compounds may be added in the process. Examples of suitable substances are acrylates and methacrylates of polyhydric alkanols (preferably of 2 to 12 carbon atoms), such as butane-1,4-diol diacrylate, triethylene glycol diacrylate, tetraethylene glycol diacrylate, hexanediol diacrylate, trimethylolpropane triacrylate, tripropylene glycol diacrylate, trimethylolpropane triacrylate, tripropylene glycol triacrylate, pentaerythritol tetraacrylate and the corresponding methacrylates, N-alkylene(bis)acrylamide and their derivatives, such as N-methylenebisacrylamide, bis(N-methylolacrylamide) glycol ether, xylylenebisacrylamide and bis-(N-methylolacrylamide) diethylene glycol ether. For special applications, their amount is preferably from 2 to 6% by weight, based on the derivatives (b). The novel radiation-crosslinkable contact adhesive mixtures can be applied directly, for example by knife coating, coating with a soft or hard roller or pouring or by means of a nozzle, in a conventional manner to the usual substrates, for example films of polyolefins, such as polyethylene and polypropylene, of polyvinyl chloride or of polyethylene glycol terephthalate In the case of indirect application, i.e. by the transfer method, the contact adhesive mixtures can first be applied in a conventional manner to a nonadhesive substrate, for example one consisting of siliconized paper, crosslinked by irradiation and then transferred to the desired substrate, for example a soft PVC film.

In general, the thickness of the layer of contact adhesive mixture is chosen to be greater than 5 lm, advantageously from greater than 20 to less than 200 lm, corresponding to coatings of more than 5 g/m² or more than 20 and less than 200 g/m², respectively. The coatings can be applied with the aid of a conventional coating apparatus and are then irradiated. Irradiation is generally carried out for a short time using high energy radiation, for example high energy electron beams, with energy doses of in general from 1 to 500 kGy (from 0.5 to 50 Mrad), preferably from 10 to 250 kGy (from 1 to 25 Mrad). If the contact adhesive mixtures contain photoinitiators of the abovementioned type, they can also be exposed to UV light. Suitable UV lamps are the conventional lamps, for example medium pressure mercury vapor lamps, which may have powers of, for example, from 80 to 100 watt/cm. Lamps of higher power generally permit more rapid crosslinking.

In the Examples which follow, parts and percentages are by weight.

Preparation of a polymer (a)

920 parts of 2-ethylhexyl acrylate, 450 parts of vinyl acetate and 30 parts of acrylic acid are added, in the course of 2 hours, to a refluxing mixture of 500 parts of ethyl acetate, 300 parts of 2-ethylhexyl acrylate, 300 parts of vinyl acetate and 11 parts of 2,2'-azobisisobutyronitrile. The mixture is then stirred under reflux for a further 2 hours, after which a solution of 4 parts of tert-butyl perpivalate in 360 parts of ethyl acetate are added in the course of 2½hours and stirring is continued for a further 3 hours. The mixture is then diluted with ethyl acetate to a content of 50% of copolymer. The copolymer has a K value of 68. It is used in the following Examples and Comparative Experiments (copolymer A).

EXAMPLE 1

0.5 part of N,N-diethylaminoethyl acrylate is added to 1,000 parts of a 50% strength solution of copolymer A in ethyl acetate under reflux in the course of 2 hours. Thereafter, 500 parts of a versatic monoester mixture consisting of roughly equal amounts of 2,3-dihydroxy-prop-1-yl acrylate and 1,3-dihydroxyprop-2-yl acrylate are added and the pressure is gradually reduced to 0.1 bar with removal of the etyl acetate by distillation and with further heating. After the ethyl acetate has been evaporated off, a mixture which is free-flowing at room temperature and has a viscosity of 50,000 mPa.s (D=21.5 1/s) at 50° C. is obtained (=contact adhesive mixture 1).

D=(shear velocity in 1/s)

COMPARATIVE EXPERIMENT 1

1,000 parts of a 50% strength solution of copolymer A in ethyl acetate are stirred under reflux for 2 hours, after which 500 parts of the versatic monoester mixture stated in Example 1 are added. The mixture is then evaporated down as in Example 1 and, after the ethyl acetate has been evaporated off, a mixture which is free-flowing at room temperature and has a viscosity of 78,000 mPa.s (D=21.5 1/s) at 50° C. is obtained (=comparative mixture 1).

EXAMPLE 2

The procedure described in Example 1 is followed, except that, after the addition of the versatic monoester mixture, 20 parts of 2,4,6-trimethylbenzo-vldiphenylphosphine oxide are also added. After the ethyl acetate has been evaporated off as described in Example 1, a free-flowing, UV-crosslinkable contact adhesive mixture is obtained (=contact adhesive mixture 2).

COMPARATIVE EXPERIMENT 2

The procedure described in Comparative Experiment 1 is followed, except that, after the addition of the versatic monoester mixture, 20 parts of the photoinitiator stated in Example 2 are added. After the ethyl acetate has been distilled off as described in Example 1, a mixture which is free-flowing at room temperature and has a viscosity of 80,000 mPa.s (D=21.5 1/s) at 50° C. is obtained (=comparative mixture 2).

EXAMPLE 3

The procedure described in Example 2 is followed, except that 500 parts of a reaction product of 5 parts of succinic anhydride and 19.5 parts of versatic monoester and a mixture of roughly equal amounts of 2,3-dihydroxy-prop-1-yl acrylate and 1,3-dihydroxyprop-2-yl acrylate are added to the reaction mixture after the addition of the versatic monoesters. The procedure is then continued as described in Example 2, and, after the ethyl acetate has been evaporated off, a mixture which is free-flowing at room temperature and has a viscosity of 80,000 mPa.s (D=21.2 1/s) at 50° C. is obtained (=contact adhesive mixture 3).

COMPARATIVE EXPERIMENT 3

The procedure described in Example 3 is followed, except that no N,N-diethylaminoethyl acrylate is added. After the ethyl acetate has been distilled off, a mixture which has a viscosity of 95,000 mPa.s (D=21.5 1/s) at 50° C. is obtained (=comparative mixture 3).

Shelf life of the contact adhesive mixtures 1 to 3 and of the comparative mixtures 1 to 3

To test the contact adhesive mixtures and comparative mixtures, sealed samples are first stored for 4 weeks at room temperature. After the storage, polyester films are coated with the mixtures on a heatable coating table at 50° C. and at 80° C. using a knife coater. The results of the coating experiments are summarized in Table 1 below:

TABLE 1

Results of the coating experiments

| Example or Comparative Experiment | Coated at 50° C. | Coated at 80° C. |
|---|---|---|
| Contact adhesive mixture 1 | Readily coatable Smooth, clear coating | Very readily coatable Smooth, clear coating |
| Comparative mixture 1 | Not coatable | Difficult to coat Coating has stripes |
| Contact adhesive mixture 2 | Readily coatable Smooth, clear coating | Very readily coatable Smooth, clear coating |
| Comparative mixture 2 | Not coatable | Difficult to coat Coating has stripes |
| Contact adhesive mixture 3 | Coatable | Very readily coatable Smooth, clear coating |
| Comparative mixture 3 | Not coatable | Difficult to coat Coating has stripes |

Evaluation of the adhesive properties of the contact adhesive mixtures 1 to 3 and of the comparative mixtures 1 to 3

To evaluate the adhesive properties of sheet-like structures coated with the contact adhesive mixtures 1 to 3 and the comparative mixtures 1 to 3, polyester films are coated at 100° C. with contact adhesive materials of Examples 1 to 3 and of Comparative Experiments 1 to 3, which have been stored for 4 weeks at room temperature, in each case in an amount of 25 g/m², corresponding to a coating thickness of about 25 lm.

The electron beam-crosslinkable coatings of contact adhesive mixture 1 and of comparative mixture 1 are exposed to the electron beam of an electron curtain unit. The UV-crosslinkable coatings of contact adhesive materials 2 and 3 and of comparative mixtures 2 and 3 are exposed, under nitrogen, on a continuous belt of a UV unit, at a speed of 10 m/min, under 2 mercury lamps in series, each having a radiant power of 80 W/cm. 2 cm wide strips of each of the exposed films are used for testing the shear strength and peeling strength.

In the peeling test, the test strips are placed on a chromium-plated sheet and are peeled off parallel to the adhesive layer, i.e. at an angle of 180°, and the force required for this purpose is measured. The takeoff speed is 300 mm/min, and the measurement is carried out immediately and after 24 hours.

The shear strength of the adhesive bond is measured by pressing the test strips onto a high-gloss chromium-plated metal sheet having a surface area of 2.0 cm×2.5 cm. The metal sheet is clamped vertically and the end of the adhesive strip is loaded with a weight of 1,000 g. The time taken to break the adhesive bond is then determined. The test is carried out at 23° C. and at 50° C.

The results of the adhesion tests are summarized in Tables 2 and 3 below.

TABLE 2

Adhesive properties of the electron beam-crosslinked coatings

| | Dose (kGy) | Peeling strength after 24 hours in N/2 cm | Shear strength in hours at | |
|---|---|---|---|---|
| | | | 23° C. | 50° C. |
| Contact adhesive mixture 1 | 7 | 9.4 | 45 | >5 |
| Comparative mixture 1 | 7 | 9.0 | 30 | 1 |

TABLE 3

Adhesive properties of the UV-crosslinked coatings

| | Atmospheric oxygen/ nitrogen atmosphere | Peeling strength after 24 hours in N/2 cm | Shear strength in hours at | |
|---|---|---|---|---|
| | | | 23° C. | 50° C. |
| Contact adhesive mixture 2 | N | 9.0 | 45 | >7 |
| Comparative mixture 2 | N | 8.5 | 30 | 4 |
| Contact adhesive mixture 3 | N | 9.7 | >50 | >3 |
| Comparative mixture 3 | N | 5.1 | 30 | 2 |

I claim:

1. A process for the preparation of a radiation-crosslinkable contact adhesive mixture from
   (a) from 5 to 120 parts by weight of polymers having a glass transition temperature of less than 0° C. and a K value of from 20 to 80 and
   (b) 100 parts by weight of derivatives of dihydroxypropyl (meth)acrylates, wherein 30–80% strength by weight solutions of the polymers (a) are mixed with the derivatives (b) and (c) from 0.01 to 0.1% by weight, based on the polymers (a), of a polymerizable tertiary amino compound, the mixture is heated at 80°–120° C. for not more than 2 hours and the solvent is then separated off under atmospheric or reduced pressure.

2. A process as claimed in claim 1, wherein a conventional photoinitiator is added to the mixture.

3. A process as claimed in claim 1, wherein from 5 to 40% by weight, based on the amount of polymers (a), of a conventional tackifier are added to the mixture.

4. A process as claimed in claim 1, wherein from 0.1 to 10% by weight, based on the amount of the derivatives (b), of a polyolefinically unsaturated compound are added to the mixture.

5. A process as claimed in claim 1, wherein the polymerizable tertiary amino compound (c) is N,N-dimethylethylaminoethyl (meth)acrylate, N,N-diethylaminoethyl (meth)acrylate, 3-3-morpholinopropyl (meth)acrylamide, 4-methacrylamido-2,2,6,6-tetramethylpiperidine or 2-N-morpholinoethyl (meth)acrylate.

6. A process as claimed in claim 5, wherein the polymerizable tertiary amino compound (c) is N,N-diethylaminoethyl acrylate.

7. A process as claimed in claim 6, wherein the derivatives of dihydroxypropyl (meth)acrylates (b) are of the formulae (I) or (II)

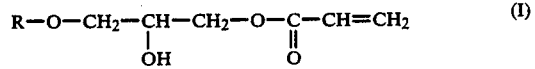

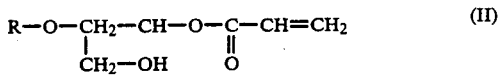

wherein R is an alkyl or acyl group of 4–6 carbon atoms.

8. A process as claimed in claim 7, wherein the derivatives of dihydroxypropyl (meth)acrylates (b) is a versatic monoester mixture of 2,3-dihydroxyprop-1-yl acrylate and 1,3-dihydroxyprop-1-yl acrylate.

9. A process as claimed in claim 8, wherein polymer (a) is a copolymer of 2-ethylhexyl acrylate, vinylacetate and acrylic acid.

* * * * *